Aug. 27, 1968  RYUICHI SATO ETAL  3,398,691
CONTROLLED VOLUME PUMPS
Filed Feb. 8, 1966  15 Sheets-Sheet 1

INVENTOR.

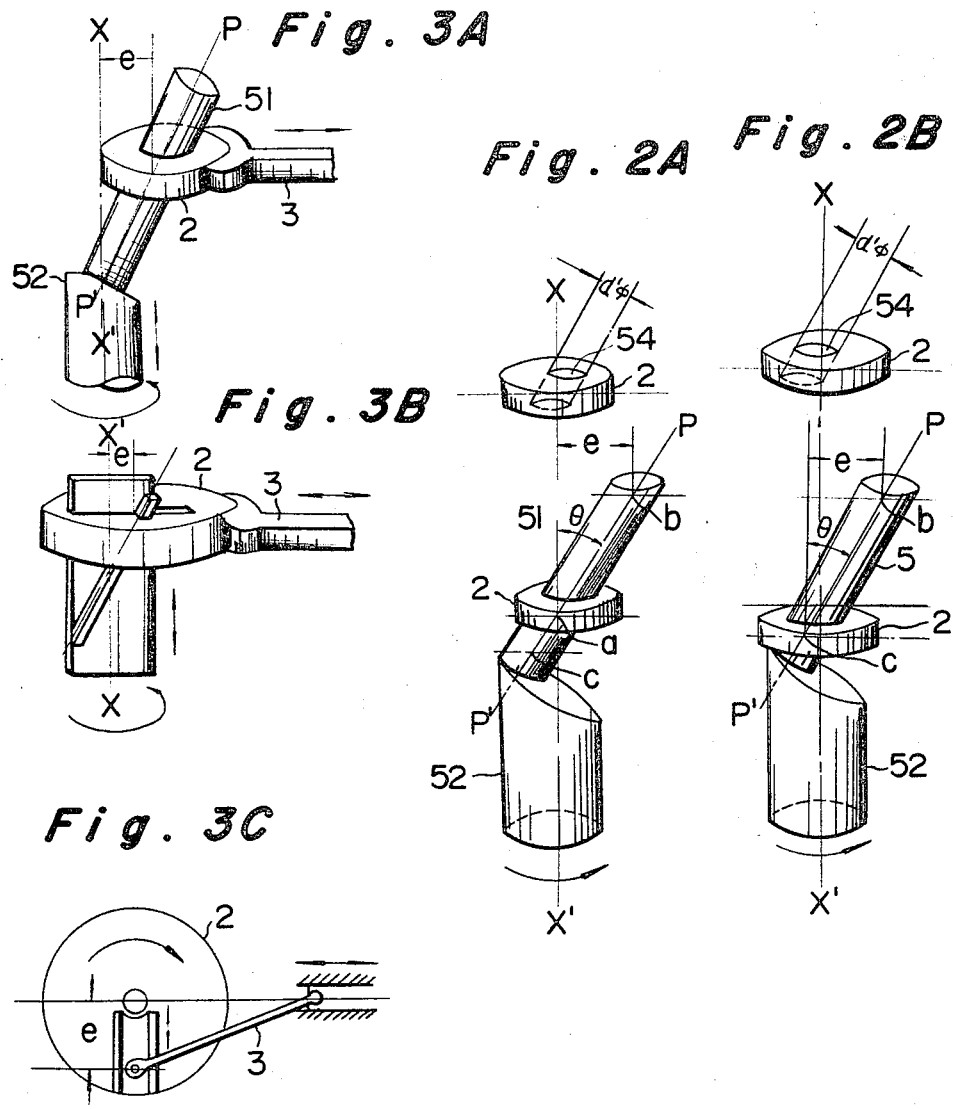

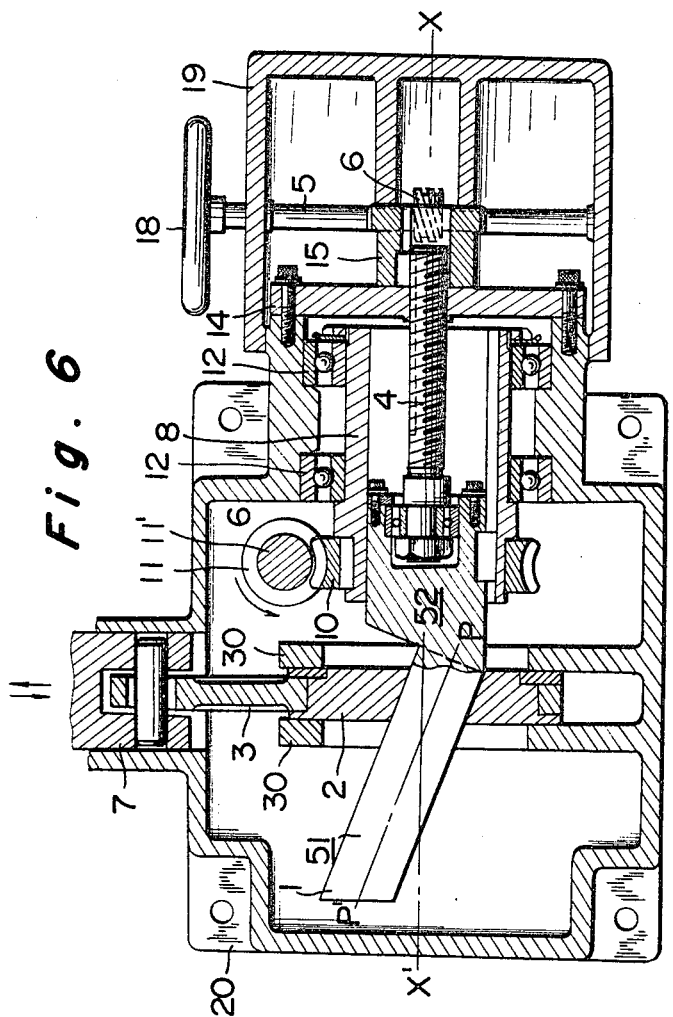

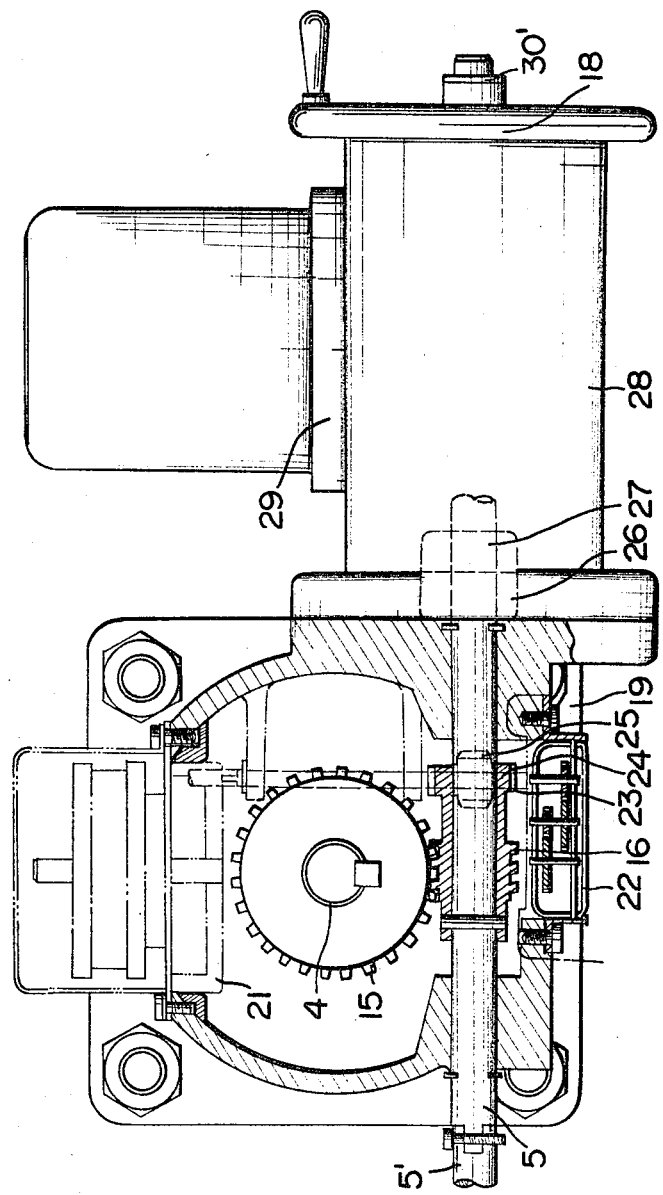

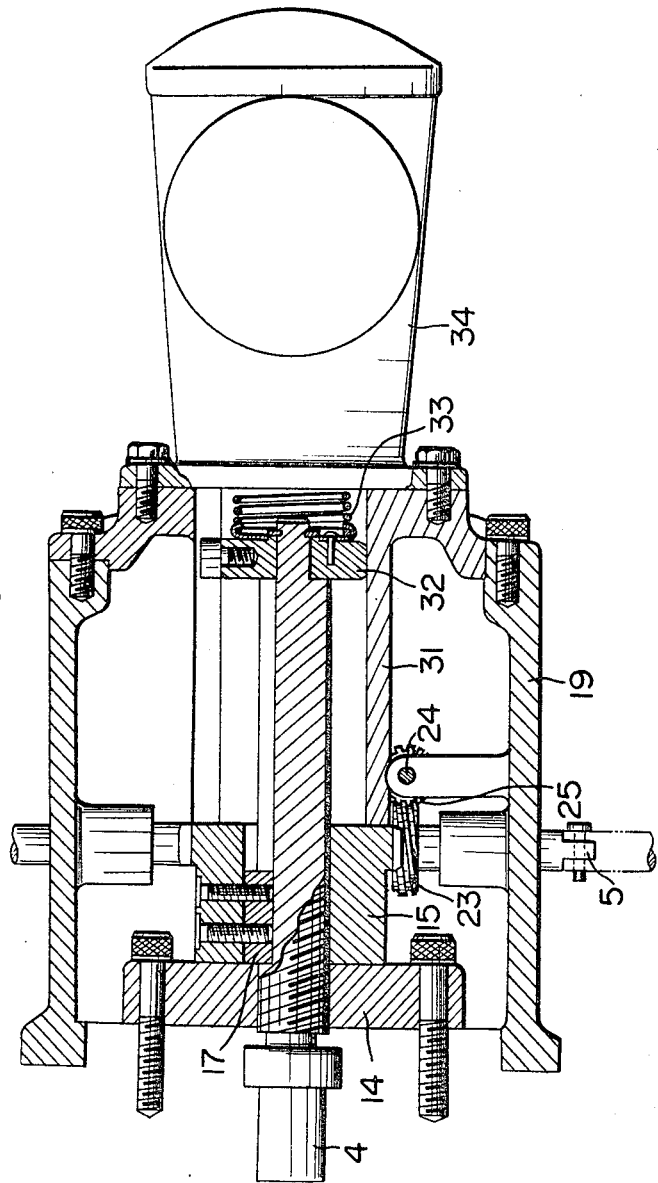

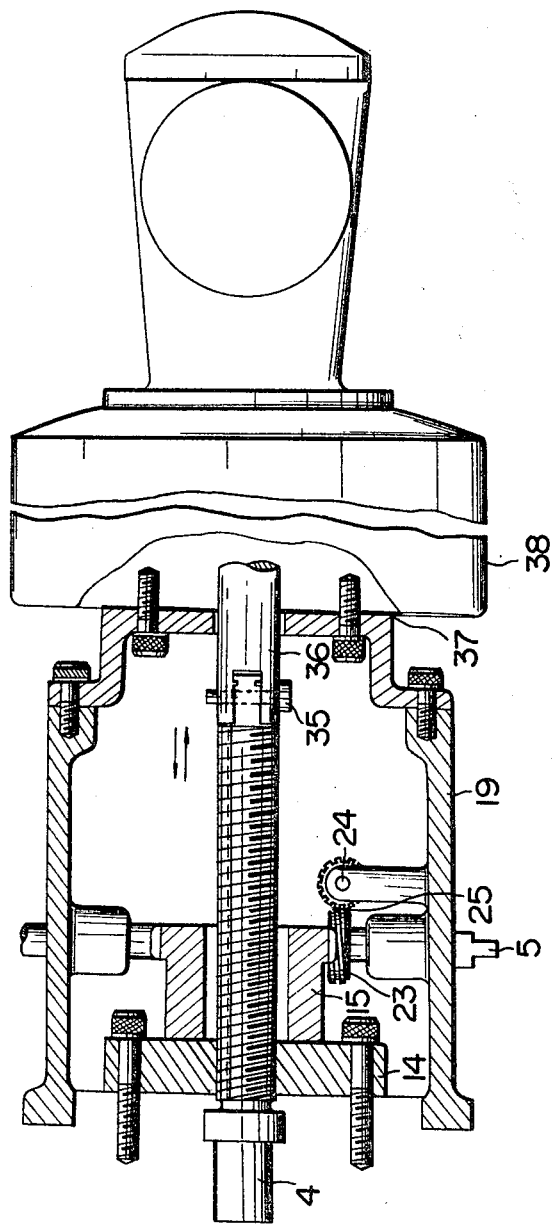

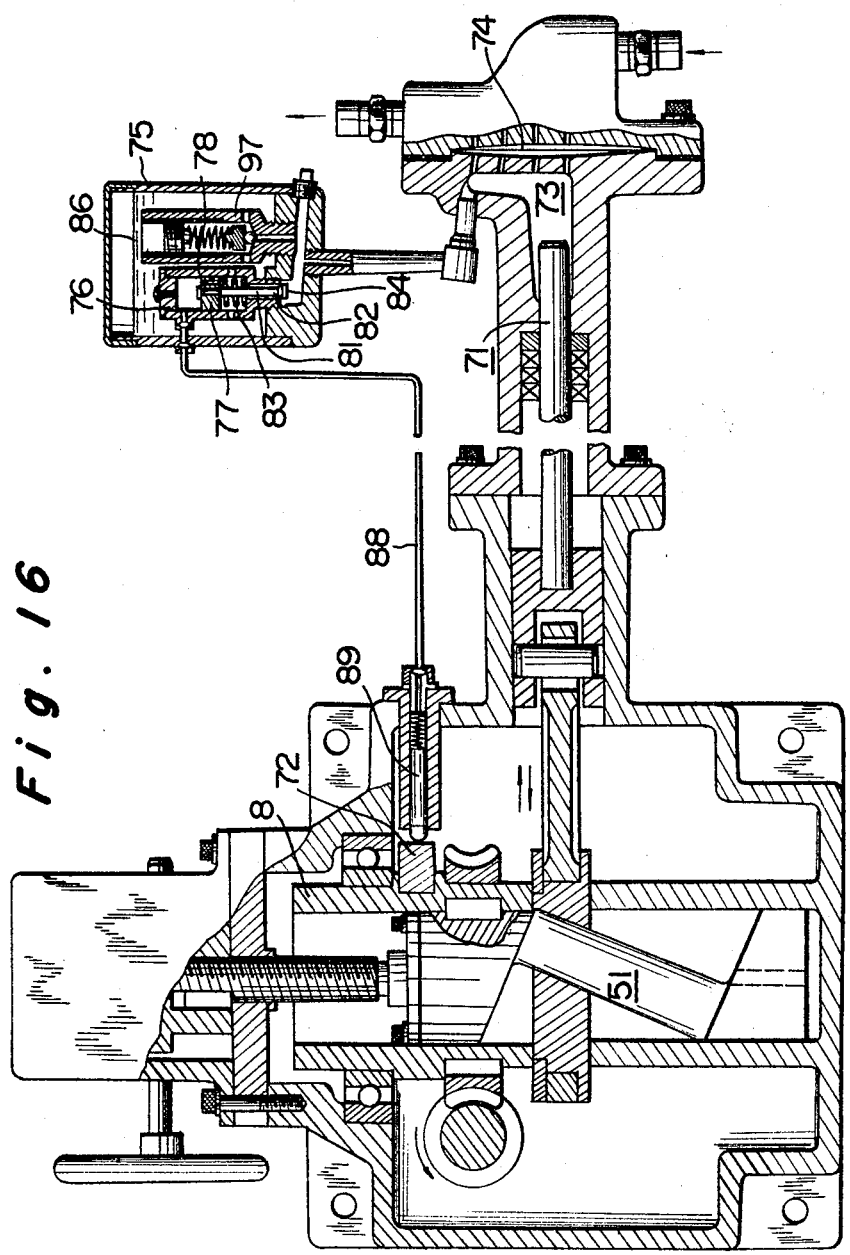

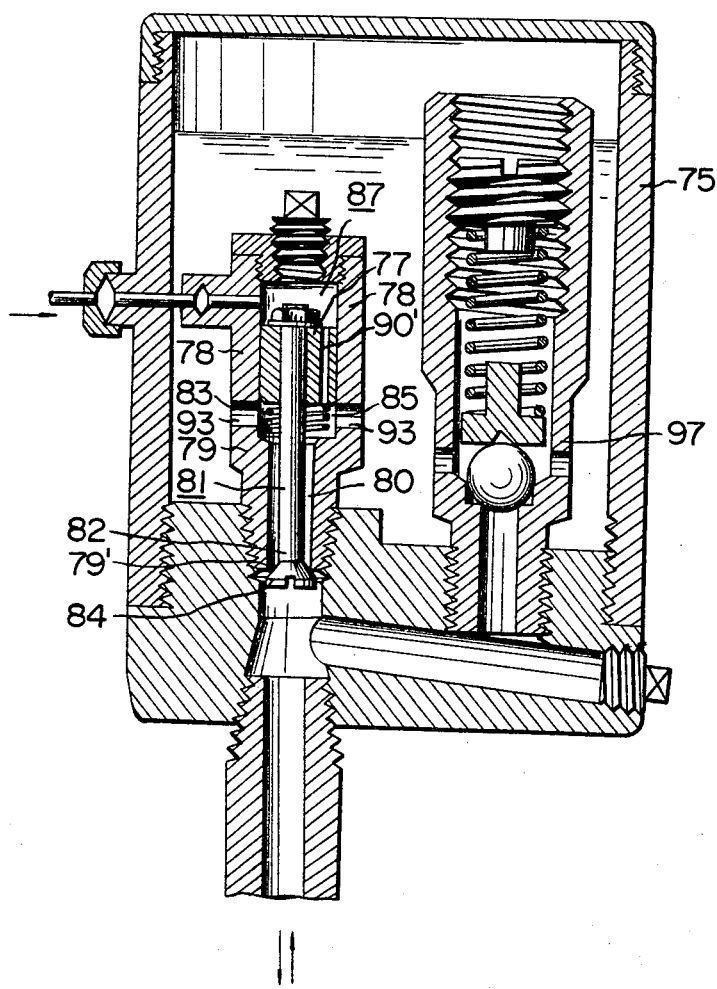

United States Patent Office 3,398,691
Patented Aug. 27, 1968

3,398,691
CONTROLLED VOLUME PUMPS
Ryuichi Sato, Masaharu Ikeya, Isamu Takeishi, and Izumi Miyauchi, Tokyo, Japan, assignors to Nippon Kikai Keiso Kaisha, Ltd., Tokyo, Japan
Filed Feb. 8, 1966, Ser. No. 525,914
10 Claims. (Cl. 103—38)

ABSTRACT OF THE DISCLOSURE

A controlled volume pump having a stroke adjusting mechanism provided between the driving means and the driven member including an eccentric shaft, a cam secured thereto and connected to said driven member, an adjusting member connected at one end to the eccentric shaft through a bearing to displace said eccentric shaft along the axis thereof, and adjusting means connected to the other end of said adjusting member for actuation thereof.

---

Figure 1:
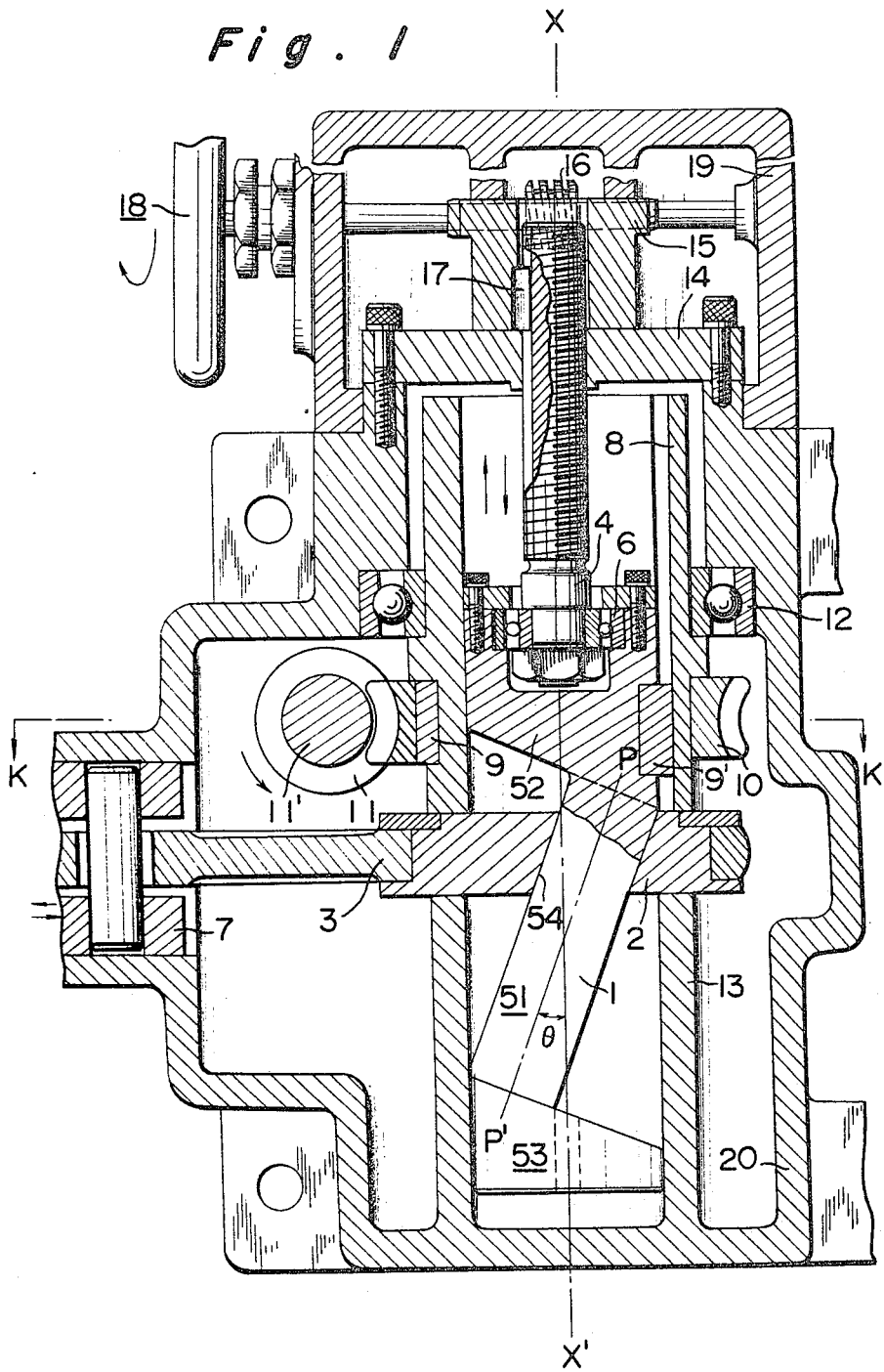

The present invention relates to controlled volume pumps, and more particularly to controlled-volume plunger pumps and combined plunger-diaphragm pumps for controlled volume pumping.

Hitherto, with controlled volume pumps which vary their stroke lengths by stroke adjusting devices, particularly, one providing a cam, the dimensions of the cam had to be increased in proportion to the stroke length, resulting in the disadvantage that the cam protrudes out of the pump frame, or the latter becomes bulky if the cam is contained in the frame for dust-proof lubrication. Accordingly, stroke adjusting mechanisms comprising the cam and contained in the pump frame have been applied to pumps of comparatively short stroke-length. Moreover, with another kind of known stroke adjusting devices the stroke lengths were adjusted mainly while pumps were running, and complicated mechanisms were required for adjustment of the stroke during operation. In addition, there was no linear relationship between the amount of displacement of an adjusting end and the resultant variation in stroke, so that conventional adjusting means could not be applied without being modified. Although adjusting means of rotary or reciprocal type are known, few of them are easily applied. In another type of known stroke adjusting devices involving the use of a lever, comparatively long stroke lengths could be obtained, while the number of strokes could not be raised.

Heretofore, as an oil pump for internal lubrication a low-speed reciprocating pump comprising suction and discharge valves and plungers was used, but wear and trouble were often caused by the many sliding parts.

An object of the present invention is to obviate the above mentioned disadvantages of known controlled volume pumps.

Another object of the invention is to provide a controlled volume pump with high accuracy which is not only simple in design but compact in size with a reduction gear mechanism built in a totally closed frame of the pump, while it retains the features and advantages of known pumps.

It is a further object of the invention to provide a stroke adjusting mechanism of the controlled volume pump based upon a concept, with which a small-sized cam is made possible to use for comparatively long stroke length under comparatively high piston force (plunger end lead).

It is a further object of the invention to provide a controlled volume pump, the stroke length of which can be varied from zero stroke to full stroke by a stroke adjusting mechanism irrespective as to whether the pump is running or not.

It is a further object of the invention to provide a stroke adjusting mechanism with a linear relationship between the amount of adjustment of the adjusting mechanism and the resultant change in stroke.

It is a still further object of the invention to provide a controlled volume pump comprising a stroke adjusting mechanism to which manual or automatic adjusting means of rotary or reciprocable type may be applied.

It is a further object of the invention to provide a self-contained high-speed rotary pump for internal lubrication of the controlled volume pump, which is obtainable with minor modification of the pump.

It is another object of the invention to provide a controlled-volume plunger-diaphragm pump comprising a device for automatic de-airing and replenishing oil for actuation, which is hydraulically driven and eliminates troublesome calbration in such known devices.

The controlled volume pump embodying the invention comprises driving means connected to a motor, a driven member to be reciprocated, a stroke adjusting mechanism provided between said driving means and driven member and including an eccentric shaft, a cam secured thereto and connected to said driven member, an adjusting member connected in alignment its one end to said eccentric shaft through a bearing to displace the eccentric shaft along the axis thereof, and a guide member for said adjusting member, and adjusting means connected to the other end of said adjusting member for actuation thereof.

In an embodiment of the invention, said driving means comprise a drive shaft, a built-in reduction gear formed by a worm and a worm gear, and a shaft sleeve secured to said worm gear by a key and supported by a pump frame through a bearing, said driven member comprising a plunger connected through a crosshead to said cam by a connecting rod, said eccentric shaft being secured to said shaft sleeve by a key so as to be displaceable along the axis of the eccentric shaft and comprising two end members and an oblique shaft member held therebetween with an oblique angle of $\theta$ to the axis of the eccentric shaft, one of said end members to be connected to said adjusting member being slidable within said shaft sleeve, the other end member being slidable and rotatable within a shaft guide member of said pump frame, and said cam having an oblique aperture of the oblique angle $\theta$ to be tightly fitted to said oblique shaft member vertical to the axis of the eccentric shaft so that with a linear relationship between the change in stroke of the plunger and the movement of the eccentric shaft along the axis thereof, the stroke length can be adjusted linearly from zero stroke to full stroke by displacing said adjusting member by said adjusting means independently of the pump being under operation or not.

Figure 4:
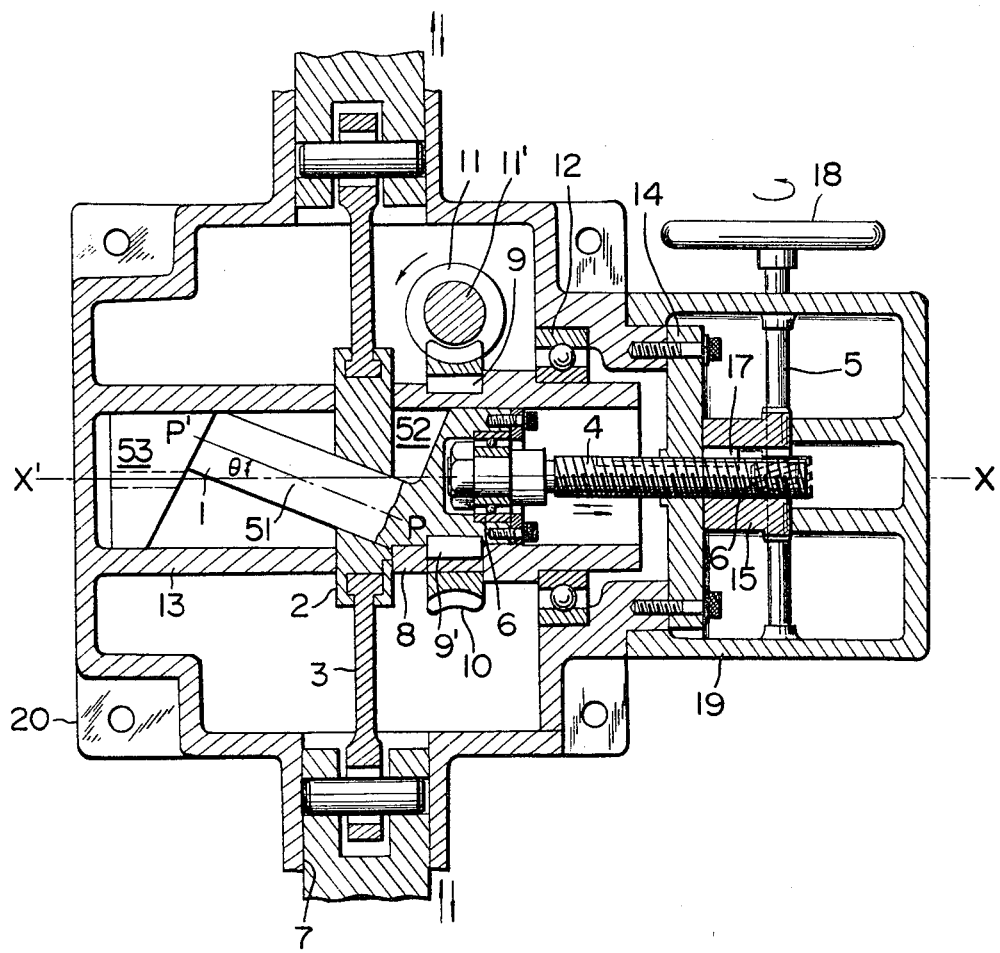
Figure 5:
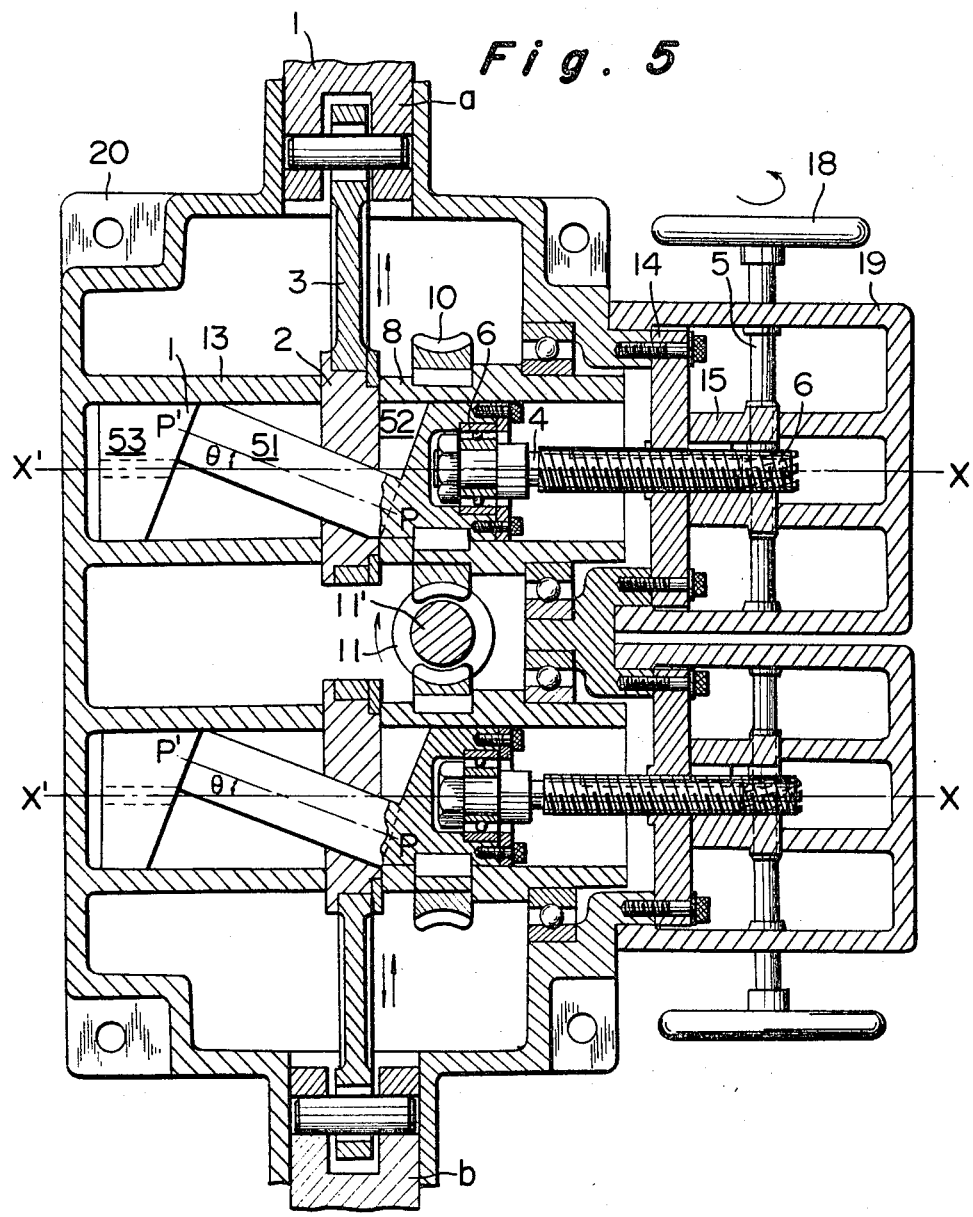
Figure 10A:
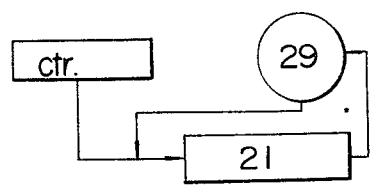
Figure 10B:
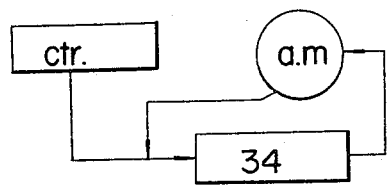
Figure 10C:
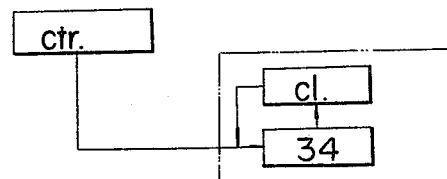
Figure 11:
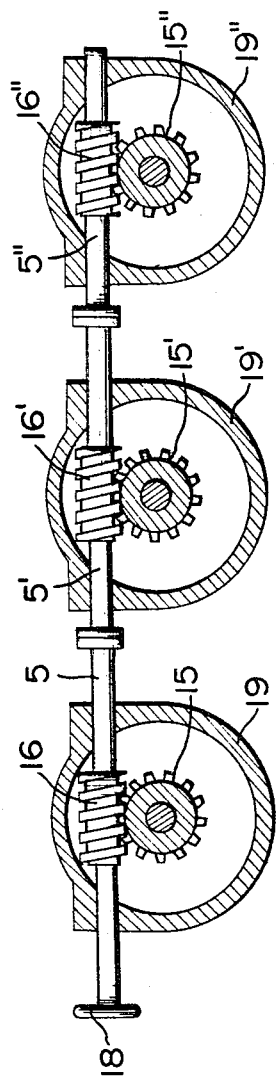
Figure 15:
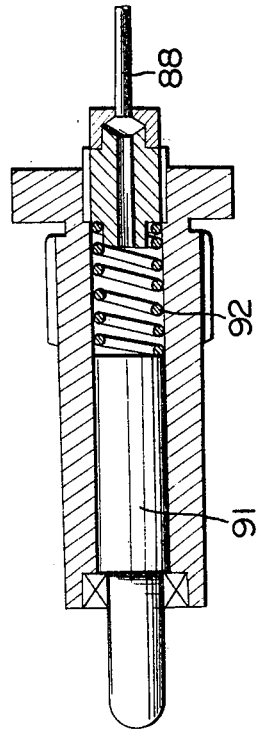
Figure 12:
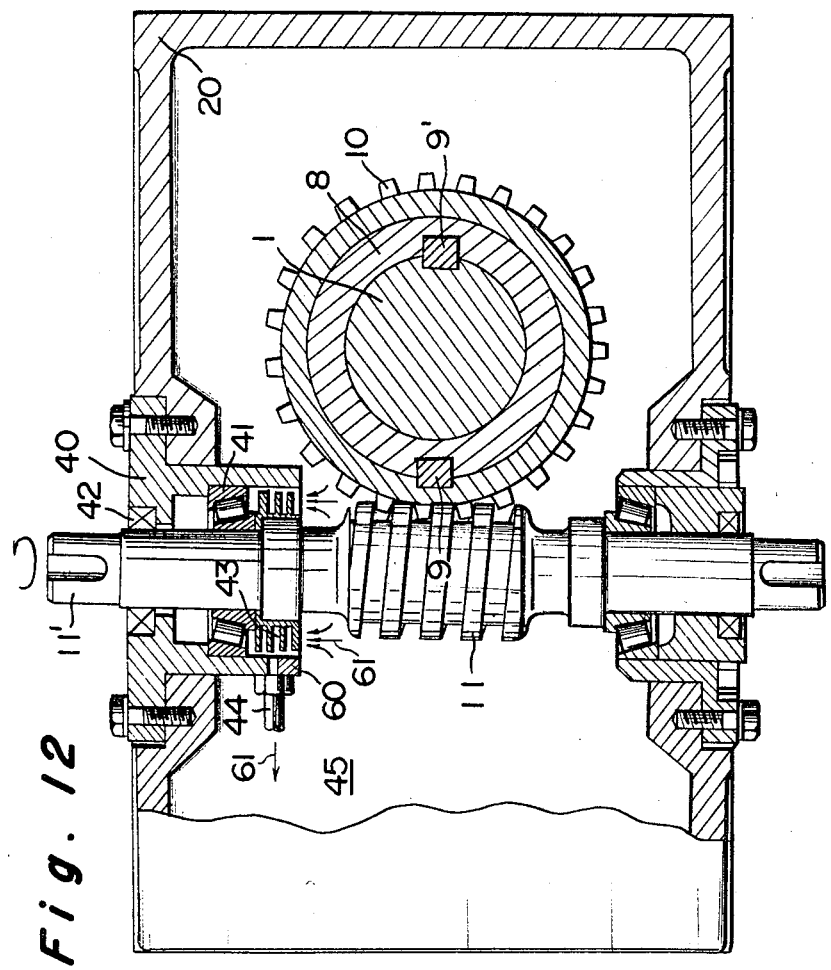
Figure 13:
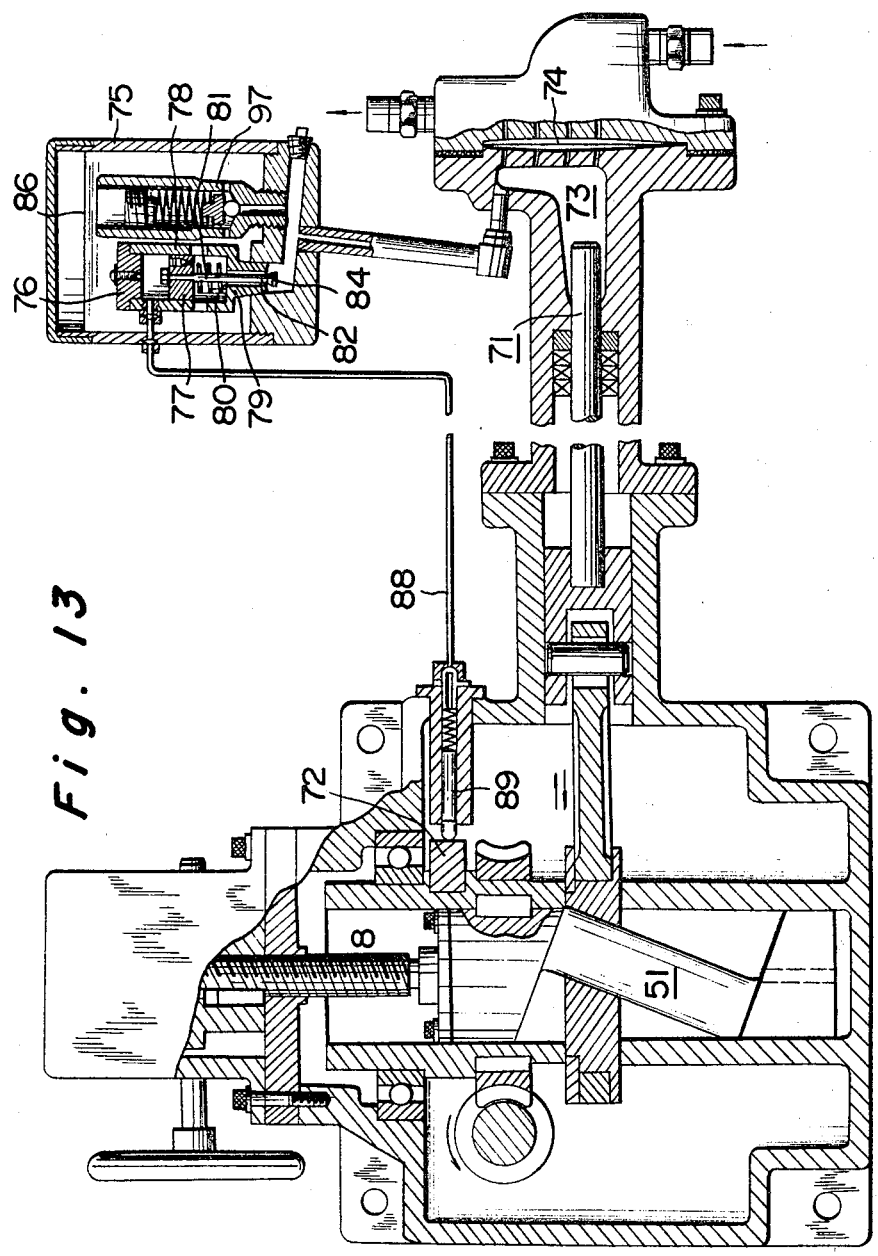
Figure 14:
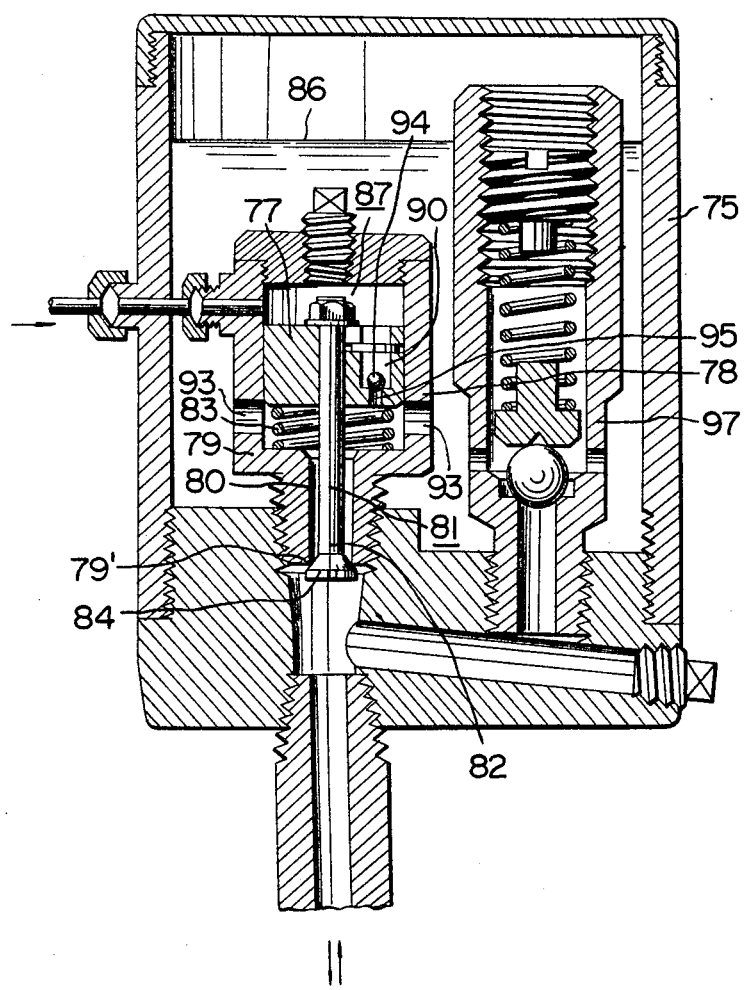

Various further and more specific objects, features and advantages of the invention will appear more fully in the following detailed description of preferred embodiments illustrated in the accompanying drawings, of which:

FIG. 1 is a sectional elevation of a controlled-volume plunger pump embodying the invention, FIGS. 2A and 2B are perspective views explanatory of proportion of a cam and an oblique shaft member embodied in the pump of FIG. 1, FIG. 3A is a perspective view explanatory of the stroke adjusting mechanism embodied in the pump of FIG. 1, FIGS. 3B and 3C are a perspective view and a plan view explanatory of two types of conventional stroke adjusting mechanisms, respectively, FIGS. 4, 5 and 6 illustrate some modifications of the invention, FIG. 7 illustrates electric automatic adjusting means of rotary type attached to the pump in section of FIG. 1, FIG. 8 illustrates pneumatic automatic adjusting means of rotary type attached to the pump in section of FIG. 1, FIG. 9 illustrates another pneumatic automatic adjusting means of reciprocable type attached to the pump in section of FIG. 1, FIGS. 10A, 10B and 10C are block diagrams corresponding to the automatic adjusting means of FIGS. 7, 8, and 9 respectively, FIG. 11 illustrates a plurality of the pumps of FIG. 1, which are connected their adjusting shafts in alignment to adjust the stroke length with a single adjusting means, FIG. 12 is a sectional elevation taken of the line K—K of FIG. 1, FIG. 13 is a sectional elevation of a controlled-volume plunger-diaphragm pump provided with a device for automatic de-airing and replenishing oil for actuation embodying the invention, FIG. 14 is a sectional elevation of an oil reservoir of the device illustrated in FIG. 13, FIG. 15 is a sectional elevation to an enlarged scale of pressure plunger means of the device illustrated in FIG. 13, FIG. 16 illustrates a further modification of the invention, and FIG. 17 is a sectional elevation of an oil reservoir of the device for automatic de-airing and replenishing oil in FIG. 16.

FIG. 1 shows a preferred embodiment of the controlled volume pumps with high accuracy according to the present invention, and its liquid end is not shown. In FIG. 1 numeral 51 is an oblique shaft member, which is held between two end members 52 and 53 and forms an eccentric shaft 1 together with them in such a manner that an axis P–P' of the oblique shaft member 51 intersects an axis X–X' of the end members 52 and 53 with an oblique angle of $\theta$. Although the oblique shaft member 51 is shown as cylindrical in FIG. 1, it may be formed in other shapes, if desired. According to our analysis and test, however, there is no need to make it such other shape. It is not to be doubted that the cylindrical shape is the best in production. In this point of view, there is one of the most important problems in our invention.

The reference numeral 2 is a cam which provides an oblique aperture 54 to be passed through by the oblique shaft member 51 at its center as shown in FIG. 2A or eccentrically as shown in FIG. 2B. The cam 2 is fitted to the oblique shaft member 51 through the oblique aperture 54 so that the cam 2 is always vertical to the axis X–X' of the eccentric shaft 1. 3 is a connecting rod which is brought into reciprocating motion upon movement of the cam 2 caused by rotation of the eccentric shaft 1. 7 is a crosshead connected to the cam 2 through the connecting rod 3, 4 and adjusting member in the form of a lead screw aligned with the eccentric shaft 1, 13 a shaft guide, 8 a shaft sleeve. 10 is a worm gear which forms a reduction gear together with a worm 11 secured to a drive shaft 11' and is secured to the shaft sleeve 8 by a key 9. 12 is a bearing, 20 a pump frame, and 9' a key for power transmission.

There is a following relationship between deviation $e$ of the cam 2 from the axis X–X' and the length of stroke $S$ $$S = 2e$$

In known mechanism, as seen from FIGS. 3B and 3C, deviation $e$ of the cam 2 was directly dependent upon dimensions thereof, so that with an increase of the stroke length S dimensions of the cam also had to be increased. On the contrary, according to the invention, the cam 2 is fitted with the oblique shaft member 51, and deviation $e$ of the cam from the axis X–X' varies with the displacement of the oblique shaft member 51 to the cam 2 in the axial direction X–X' of the eccentric shaft 1. Thus, as seen from FIG. 3A, dimensions of the cam 2, in principle, is imposed by the stroke length without severe restriction.

Driving power, which is fed from the drive shaft directly connected to a motor, enables the cam 2 to swing through the oblique shaft member 51 of the eccentric shaft 1 at a predetermined speed of revolution reduced by the reduction gear, whereas the connecting rod 3 coupled with the cam 2 is put into reciprocating motion. The eccentric shaft 1 is connected through a bearing 6 to the lead screw 4 for stroke adjustment, which engages an internal thread of a guide member 14 fixed to the frame 20 and serving as a fixed nut. Thus, with turning of the lead screw 4 the eccentric shaft 1 is displaced in its axial direction X–X' through the shaft sleeve 8, the cam 2 and the shaft guide 13. By this mechanism, the stroke length can be adjusted linearly from zero stroke to full stroke.

In case the oblique aperture 54 is provided at the center of the cam 2 with an oblique angle of $\theta$ to the axis X–X' as shown in FIG. 2A, part $a$–$b$ of the oblique shaft member 51 is efficacious for linear adjustment of the stroke length from zero stroke to full stroke, while the remaining part $a$–$c$ is not directly concerned with the stroke adjustment. In the above case, if the aperture 54 is provided eccentrically with respect to the center of the cam 2 as shown in FIG. 2B, the stroke adjustment from zero stroke to full stroke can be obtained with part $c$–$b$ of the oblique shaft member 51. This assembly may be suitably constructed in proportion to diameter of the cam 2 and length of the oblique shaft member 51.

In the embodiment the eccentric shaft 1 is supported by both the shaft guide 13 and the shaft sleeve 8. Although the oblique shaft member 51 consists, in general, of a bar having a circular section to be applied to the circular oblique aperture 54 of the cam 2, a bar having a circular, square or rectangular section and/or a key way may be adopted, if necessary, as the shaft member to be fitted to a circular, square or rectangular oblique aperture and/or a key way of the cam 2.

There has been similar construction of a crank and a crank sleeve, which has been used as a sleeve of a handle lever and others. However, it comprises a sliding surface between the sleeve and the surface of the crank. Accordingly, in the construction according to the invention the rotating surface is provided between the periphery of the cam 2 and the connecting rod 3 but not on the fitting surface of the cam 2 with the oblique shaft member 51.

The lead screw 4 is connected through a key 17, an adjusting gear 15 and an adjusting pinion 16 to an adjusting shaft 5 mounted on an adjustment head 19. One end of the adjusting shaft 5 is used as an adjusting end, to which a handle 18 is secured so that the lead screw 4 and hence the eccentric shaft 1 connected thereto in alignment are displaced by turning of the handle 18. Accordingly, the displacement of the eccentric shaft 1 is proportional to a number of turns of the handle 18, while the position of the handle 18 remains constant. The handle can be easily replaced by automatic adjusting means of rotary type or reciprocating type. Upon application of the automatic adjusting means of reciprocating type, the guide member 14 is replaced by one which has no internal thread and the lead screw 4 is directly connected to an output shaft of the adjusting means. With this arrangement automatic adjustment of the movement of the lead screw 4 is directly carried out so that the movement of said output shaft causes that of the eccentric shaft 1 along the axis thereof, and it is in direct proportion to the variation of the length of stroke. Moreover, the axis of movement of the lead screw 4 is always fixed, thereby the adjusting means being easily attached.

While, any reduction ratio of the reduction gear consisting of the worm 11 and the worm gear 10 can be obtained by suitable choice of gear ratio. This self-contained reduction mechanism is advantageous for the stroke adjusting mechanism of the invention, because due to fitness for comparatively high speed rotation in contrast with conventional stroke adjusting mechanism of lever type, its reduction ratio may be chosen over comparatively wide range from high value to low value. Moreover, the worm gear 10 is secured to the shaft sleeve 8 to form a part of the stroke adjusting mechanism, resulting in a compact structure of the pump, which is totally enclosed and dust-sealed with the frame 20 and eliminates the need of a separate reduction gear generally required for variable stroke pumps.

FIG. 4 shows another embodiment of the invention with high precision, in which a plurality of the crossheads 7 coupled with the single cam 2 through the connecting rod 3 are brought into reciprocating motion by a single motor driving the eccentric shaft 1 through the reduction gear 11, 10, and the lengths of stroke of the crossheads 7 can be adjusted by a single manual adjusting means comprising the handle 18 through the adjusting shaft 5, the pinion 16 and the lead screw 4. Therefore, with this controlled volume pump, saving power of the motor, elimination of pulsation of the liquid output, and output control of the pump from zero to maximum upon manufacturing a single product by mixing various medical fluids can be easily achieved. In FIG. 4 liquid ends are not shown. An end of each of the connecting rods 3 remote from the crossheads is made in the form of cam follower with par-removed fan-shape so that under operation each of the connecting rods 3 can not make contact with each other on the cam 2. With rotation of the eccentric shaft 1 the respective crossheads 7 connected to the connecting rods 3 perform pumping action at each liquid end. Other parts are similar to those shown in FIG. 1.

The combination of the pumps of FIG. 4 provides two crossheads or pumps which are 180 deg. apart. Similarly, three crossheads or pumps which are 120 deg. apart each other may be easily applied to a single cam.

The pump assembly without pulsation of the discharge rate which has the cam 2 formed as mentioned above and shown in FIG. 4 has such advantages that two cams of the conventional pumps, which need special working, are replaced by a single cam, that phase adjustment between each of the two cams is not needed and that discharge flow of the pump is adjusted by a single stroke adjusting mechanism.

FIG. 5 shows another embodiment of the invention with its liquid end not shown, wherein a common drive shaft carrying a common worm 11 is arranged between two worm gears 10 of two pumps a and b each having the stroke adjusting mechanism as shown in FIG. 1, resulting in a multi-pump with a common frame 20. Other parts are similar to those shown in FIG. 1. The worm of the drive shaft 11 engages the worm gears 10 so that difference in phase of the pumps a and b equals 180 deg. Resultant horsepower required for the two pumps is equal to that required for a single pump except mechanical friction loss being twice. In the present embodiment each of the pumps a and b provides its own stroke adjusting mechanism, respectively, and thus functions as a pump independent to the other. In addition, the lengths of stroke and hence liquid outputs of the pumps a and b can be adjusted simultaneously by connecting in alignment the respective adjusting shafts 5 of the adjusting means through the coupling means as shown in FIG. 11. The two pumps are contained in the single frame under common lubrication, so that large space such as required for installation of the conventional pumps and accessories therefor are not needed while the integrated pump of the invention provides capacity for two sets of the conventional pumps.

FIG. 6 shows another embodiment of the invention with high accuracy, and its liquid end is not shown. In this arrangement an overhung eccentric shaft 1 is used which is made by incorporating the oblique shaft member 51 with the single end member 52. The other end member 53 as seen in FIG. 1 is dispensed, and a cam retainer, instead of the shaft guide 13, prevents the cam 2 from moving in the axial direction X–X'. Others are similar to those shown in FIG. 1.

If the oblique shaft mtmber 51 of the eccentric shaft 1 shown in FIG. 1 is desired to extend its length for the purpose of an increase of the stroke length, diameter of the end members 52 and 53 to hold said shaft member 51 therebetween and hence diameter of the worm gear 10 of the reduction gear must also be increased. Moreover, with a constant length of the stroke an increase of diameter of the oblique shaft member 51 naturally requires that of diameters the end members 52 and 53. Accordingly, when the eccentric shaft 1 comprises the two end members 52 and 53 to hold the oblique shaft member 51 therebetween, mutual restriction of the end members and the oblique shaft member in dimensions has great influence upon the whole construction of the pump. According to the arrangement shown in FIG. 6, said restriction on the end members and the oblique shaft member is largely removed by dispensing with the end member 53. Thus, for the same end member 52, the same diameter of the worm gear 10 and the same bearing 12 as those illustrated in FIG. 1, about 1.5 times as long as the maximum length of stroke is obtainable, which can be varied linearly from zero stroke to full stroke irrespective as to whether the pump is under operation or not.

FIG. 7 shows one embodiment of adjusting means of the stroke adjusting mechanism, in which said adjusting means is illustrated as an electric automatic adjusting means of rotary type attached to the adjustment head 19 shown in section. In this arrangement an operating circuit is formed by an electric servomotor 29 and a feedback potentiometer 21 therefor and its block diagram is shown in FIG. 10A. In general, a controller *ctr* is located at an operating chamber remote from a place to install the pump.

Upon rotation of the adjusting shaft 5 the pinion 16 fitted thereto brings the adjusting gear 15 into rotation, causing rotation of the lead screw 4 followed by movement of the eccentric shaft 1 along the axis X–X' for linear adjustment of the stroke length from zero stroke to full stroke. The adjusting shaft 5 is also fitted with a dial gear 23, which turns a dial pinion 25 and a dial shaft 24 fitted therewith corresponding to the amount of rotation of the adjusting shaft 5. One end of said dial shaft 24 is provided with a dial indicator 22 for indicating the stroke length and the other end is connected to the feedback potentiometer 21. The adjusting shaft 5 is brought into rotation through the electric servomotor 29 and a reduction gear 28, an output shaft 27 of which is connected to the adjusting shaft 5 through coupling means 26. A clutch 30' and the handle 18 are provided for manual adjustment in addition to automatic adjustment of the stroke length. 5' is an adjusting shaft of another pump, which is to be connected to the shaft 5 for adjusting the stroke length of a plurality of pumps with a single adjusting means as shown in FIG. 7.

Of rotary adjusting means, pneumatic one is illustrated in FIG. 8. It is sufficient for this construction that the electric servomotor 29 and the potentiometer 21 of FIG. 7 are replaced by a pneumatic servomotor *am* and a pneumatic feedback positioner 34 to be connected to a part of the lead screw projecting from the adjusting gear respectively. Its block diagram is shown in FIG. 10B, in which *ctr* is a controller. In FIG. 8, 32 is a sliding nut, 31 a sliding nut guide and 33 a range spring.

The constructions shown in FIGS. 7 and 8 have such features that the position of the adjusting means, for example, the position of the handle 18 in FIG. 7 remains constant regardless the length of stroke, thereby the dial indicator 22 and the rotary feedback potentiometer 21 being easily attached, and that alteration from manual adjustment to automatic adjustment and alteration from electric system to pneumatic system are remarkably facilitated, thus any type of the adjusting means can be applied arbitrarily. The above-mentioned is of special importance for the controlled volume pumps for which saftey and explosion proof are required.

FIG. 9 shows another embodiment of the invention, in which adjusting means 38 of reciprocable type is connected in alignment to the lead screw 4 and the guide member 14 is replaced by one which has no internal screw. The adjusting means of rotary type can be easily changed into that of reciprocable type by substituting a bracket 37 of the adjusting means 38 for the sliding nut guide 31 and connecting the lead screw 4 to an output shaft 36 of the adjusting means 38. The block diagram is shown in FIG. 10C, in which cl is a cylinder means of reciprocable type, 34 the positioner, and ctr is the controller. With this adjusting means the adjusting shaft 5 is not concerned with the stroke adjustment.

As shown in FIG. 11, when a plurality of said adjusting ends of the pumps are actuated by a single handle or adjusting means, the respective adjustment heads 19, 19', 19" and the like are turned about the axis X–X' of their own eccentric shaft 1 so that a plurality of the adjusting shaft 5, 5', 5" and the like are arranged in alignment with each other, and then the adjusting shafts 5, 5', 5" and the like are connected through coupling members. The handle 18 may be provided at the end opposite to that shown in FIG. 11, if necessary.

Referring to FIG. 12, the invention has been shown as embodied in a built-in rotary pump means for internal lubrication of the controlled volume pump of FIG. 1 with the totally closed frame filled with lubricating oil. To construct the rotary pump an impeller 43 is provided at a part of the drive shaft inside of the frame and adjacent to a bearing assembly 41, and an end cap 60 of said bearing assembly 41 is extended inwardly so as to form a cylindrical end 40 by covering said impeller 43 and provided with a discharge pipe, resulting in a high-speed rotary pump with the drive shaft directly connected to a motor rotating at high speed. Operation of this rotary pump is as follows: Upon rotation of the drive shaft 11' the oil contained is driven through a discharge pipe 44 secured to the cylindrical end 60 in a direction as indicated by arrows 61 and also flows through the impeller 43 and the bearing assembly 41 in the axial direction of the drive shaft 11'. Thus, complete lubrication of the bearing assembly 41 is carried out, while leakage of the oil is prevented by an oil seal 42 provided at an outer end of the end cap 40. The rotary pump of the invention, of course, may be modified so that the cylindrical end is provided with a plurality of discharge pipes and a plurality of driven gears are driven by one drive shaft.

As seen from the above-mentioned, the built-in rotary pump means according to the invention has such advantages that it is simple in structure with minor modification of the end cap to form a high-speed rotary pump instead of a separate conventional reciprocating pumps, that sliding parts which may cause trouble are reduced, and that forced lubrication is preferably carried out with much discharge flow of the oil.

FIG. 13 illustrates a preferred embodiment of a controlled volume plunger-diaphragm pump of the invention, in which numeral 71 is a plunger of the pump, which is brought into reciprocating motion by rotation of the shaft sleeve 8 so that pulsating pressure is imparted to a diaphragm 74 through oil for actuation filled in a displacement chamber 73, resulting in stable pumping action. An oil reservoir 75 is located above said displacement chamber 73. A pressure plunger means 89 is actuated by a cam 72 mounted on the shaft sleeve 8 in such synchronized manner that said means 89 reaches its maximum discharge stroke only at the end of suction stroke of the plunger 71. The pressure plunger means 89 comprises a plunger 91 and a return spring 92 as shown in FIG. 15, whereby being actuated at one end. In the oil reservoir 75, as shown in FIG. 14, a valve mechanism comprising a cylinder 78 and a piston 77 to be moved upwardly and downwardly therein is fixed below an oil level 86. The piston 77 is provided with a piston rod 81 which passes through a lower end 79 of the cylinder 78 with predetermined clearance 80. At an extremely lower end 82 of the piston rod 81 is provided a valve head 84 to close, through actuation by a spring 83 arranged in a lower cylinder chamber 85, said clearance 80 in co-operation with the extremely lower end 79' of the cylinder 78 serving as a valve seat, and this valve assembly permits the oil to flow toward only the displacement chamber side. The lower cylinder chamber 85 beneath said piston 77 communicates with only the oil in said oil reservoir 75 through openings 93 shown in FIG. 15, and an upper cylinder chamber 87 on the piston 77 communicates with the pressure plunger means 89 through a pipe 88. Moreover, the piston 77 provides a ball valve assembly 90 which comprises a ball 94 and a passage 95 with a lower portion of diameter smaller than that of the ball 99 as shown in FIG. 15, so that the lower cylinder chamber 85 communicates with the upper cylinder chamber 87 depending upon oil pressure of said cylinder chamber 85 only. The pressure plunger means 89 is located below the oil level 86.

With rotation of the shaft sleeve 8 driven by the worm mechanism, said piston 77 is positively driven in synchronism with the main plunger 71 through the oil in said pipe 88 to open said valve assembly 79', 84 periodically, thereby air bubbles rising from the displacement chamber 73 being released through said clearance 80. Since this action is performed below the oil surface 86, air bubbles are replaced by the oil, a decrease of the oil for actuation in the displacement chamber 73 due to leakage is compensated. When the displacement chamber 73 lacks for the oil corresponding to variation of the stroke length of the plunger 71, pressure of the oil in said chamber 73 becomes negative, so that at the end of suction stroke of the plunger 71 the oil is replenished through the valve assembly 79', 84. On the contrary, with an excess of the oil in the displacement chamber 73, the oil is discharged from said chamber 73 into the oil reservoir 75 through the valve assembly 79', 84 at the beginning of discharge stroke of the plunger 71. While, a decrease of the oil in the pressure plunger means 89 is automatically compensated by replenishing oil in such a manner that the ball 94 is lifted for induction of the oil by negative pressure inside of said pressure plunger means 89 at its suction stroke and by potential head between the oil levels in the oil reservoir 75 and said plunger means 89.

In the above-mentioned device for automatic de-airing and replenishing oil for actuation, the ball valve assembly 90 of the piston 77 consisting of the ball 44 and the passage 95 may be replaced, as shown in FIGS. 16 and 17, by a narrow passage 90' which communicates the upper and lower cylinder chambers 87 and 85 with flow resistance of predetermined value based upon viscosity of the oil.

As explained above, the device for automatic de-airing and replenishing the oil according to the invention is driven hydraulically, so that it does not need complicated transmission mechanisms which are used in transmission system by mechanical elements and requires to pay attention to wear. Thus, the device can be located, at any desirable place, even near the displacement chamber and applied to any type of diaphragm with complete de-airing action. Furthermore, with the automatic de-airing and replenishing device of the invention, which is of type positively driven by hydraulic pressure at the both faces of the piston, de-airing action independent of air tightness of a gland part of the main plunger may be obtained without troublesome adjustment of spring pressure which needs to take oil pressure of the displacement chamber for comparison as required in devices of type driven at one face of the piston. Accordingly, the device of the present invention has features that it is not only simple for operation but compact in structure providing both functions of de-airing and replenishing the oil for actuation.

While we have shown and described preferred forms of our invention by way of illustration, further modifications will occur to those skilled in the art. We therefore contemplate by the claims which conclude this specification to cover all such modifications as fall within the true spirit and scope of our invention.

What we claim is:

1. A motor-driven, controlled volume pump comprising a pump frame; a drive shaft connected to said motor; a built-in reduction gear formed by a driving gear connected to said drive shaft and a driven worm gear; a shaft sleeve secured to said driven worm gear and rotatable thereby; a first bearing, said shaft sleeve being rotatably supported on said pump frame through said bearing; an eccentric shaft having at least one end member secured within said shaft sleeve for rotation of said eccentric shaft, and an ablique shaft member secured at one end to said end member and disposed at an oblique angle of θ to the longitudinal axis of said eccentric shaft, said end member being slidable within said shaft sleeve for the longitudinal displacement of said eccentric shaft; a cam formed with an oblique aperture of said oblique angle θ therethrough, said aperture being adapted to slidably receive said oblique shaft member for rotation thereby, said cam being retained by said pump frame to substantially prevent displacement thereof along the longitudinal axis of said eccentric shaft, said cam being displaceable in a direction transverse to said axis in response to the displacement of said eccentric shaft along said axis; at least one connecting rod operatively connected at one end to said cam; a cross-head connected to the other end of said connecting rod; a plunger connected to said cross-head and reciprocated in response to the rotation of said cam; a second bearing; an adjusting member aligned to said eccentric shaft and connected at one end through said second bearing to said eccentric shaft to displace said eccentric shaft along the longitudinal axis thereof; a guide member secured to said pump frame and formed with an aperture therethrough for receiving said adjusting member; and adjusting means connected to the other end of said adjusting member for actuation thereof, whereby the stroke length of said pump can be adjusted linearly from zero stroke to full stroke by displacing said adjusting member by said adjusting means irrespective of whether said pump is running or not.

2. A motor-driven, controlled volume pump as claimed in claim 1, wherein said eccentric shaft has a second end member, said oblique shaft member being retained between said first-mentioned end member and said second end member, said pump frame being formed with a shaft guide, said second shaft member being longitudinally displaceable and rotatable within said shaft guide.

3. A controlled volume pump as claimed in claim 1, wherein said guide member is formed with an internal thread about the aperture formed therein, said adjusting member being in the form of a threaded bar engaging said guide member internal thread, said pump frame being formed with an adjustment head having an aperture therethrough, said adjusting means having an adjusting shaft rotatably secured to said adjusting head and having one end thereof extending through said adjusting head aperture beyond said pump frame, a handle secured to said adjusting shaft and extending beyond said pump frame, an adjusting gear secured to said adjusting member and an adjusting pinion carried by said adjusting shaft and operatively engaging said adjusting gear, whereby said adjusting member and said eccentric shaft are displaced along the longitudinal axis thereof upon the turning of said handle.

4. A motor-driven, controlled volume pump as claimed in claim 1, wherein said guide member is formed with an internal thread about the aperture formed therein, said adjusting member being in the form of a threaded bar engaging said guide member internal thread, said pump frame being formed with an adjustment head having an aperture therethrough, said adjusting means having an adjusting shaft rotatably secured to said adjustment head and extending through said aperture outside said pump frame, an adjusting pinion carried by said adjusting shaft, a dial gear carried by said adjusting shaft, an adjusting gear secured to said adjusting member, said adjusting pinion operatively engaging said adjusting gear to displace said adjusting member and said eccentric shaft along the axis thereof upon the rotation of said adjusting shaft, an electric servomotor operatively connected to said adjusting shaft to rotate said adjusting shaft, a dial shaft, a dial pinion carried by said dial shaft, said dial gear operatively engaging said dial pinion to rotate said dial shaft, a dial indicator connected to one end of said dial shaft to indicate the stroke length corresponding to an amount of rotation of said adjusting shaft, and a feedback potentiometer connected to the other end of said dial shaft and operatively connected to said electric servomotor.

5. A motor-driven, controlled volume pump as claimed in claim 1, wherein said pump frame being formed with an adjustment head having a first and second aperture therethrough, said adjusting member being in the form of a threaded bar, said adjusting means having an adjusting shaft secured to said adjustment head and extending through said first aperture out of said pump frame, an adjusting pinion carried by said adjusting shaft, a dial gear carried by said adjusting shaft, an adjusting gear secured to said adjusting member and operatively engaging said adjusting pinion to displace said adjusting member and said eccentric shaft along the axis thereof upon the rotation of said adjusting shaft, a pneumatic servomotor operatively connected to said adjusting shaft to rotate said shaft, a pneumatic feedback positioner secured to said adjustment head outside said pump frame at said second adjustment head aperture, said pneumatic feedback positioner being operatively connected to said adjusting member and to said pneumatic servomotor to feedback-control said motor, a dial shaft, a dial pinion carried by said dial shaft and operatively engaging said dial gear, and a dial indicator connected to one end of said dial shaft to indicate the stroke length corresponding to an amount of rotation of said adjusting shaft.

6. A controlled volume pump as claimed in claim 1, wherein said adjusting member is in the form of a threaded bar, said adjusting means having a pneumatic feedback positioner, and reciprocable cylinder means connected to said feedback positioner and having an output shaft connected to said adjusting member.

7. A motor-driven controlled volume pump as claimed in claim 1, wherein said pump frame is formed with an aperture therethrough, said drive shaft extending through said aperture between said motor and said driving gear, and including a bearing assembly in said pump frame aperture for supporting said drive shaft, an impeller secured to said drive shaft inside said pump frame and adjacent to said bearing assembly, said bearing assembly having a cylindrical end cap extending therefrom inside said pump frame, said cylindrical end cap having an aperture therethrough, adjacent to said impeller, and discharge pipe means attached to said cylindrical end cap at said end cap aperture whereby a self-contained rotary oil pump operated by the rotation of said drive shaft is provided.

8. A motor-driven, controlled volume pump as claimed in claim 1, including a displacement chamber, oil filled within said displacement chamber, a diaphragm actuated by said plunger through said oil, and an automatic de-airing and oil-replenishing device having an oil reservoir, a cylinder fixed within said reservoir below the oil surface and formed with one end thereof enclosed by an end wall, a piston disposed within said cylinder dividing said cylinder into upper and lower cylinder chambers, a piston rod connected to said piston at one end, extending through the lower end of said cylinder with predetermined clearance, and formed at its lower end with a valve head adapted to close the lower end of said cylinder, a spring disposed within said lower cylinder chamber and adapted to retain said valve head against said cylinder lower end, said cylinder being formed with an aperture therethrough adjacent to said lower cylinder chamber to permit the passage of oil between said lower cylinder chamber and said oil reservoir, said piston having oil passage means therethrough adapted to permit oil to pass between said upper and lower cylinder chambers depending upon the difference in oil pressures within said upper and lower cylinder chambers respectively, means for connecting the lower end of said cylinder and said displacement chamber to permit the passage of oil and air therebetween, pipe means extending from said upper cylinder chamber and out of said reservoir, a pressure plunger means connected to said pipe means, a cam secured to said shaft sleeve and operatively engaging said pressure plunger means, said cam being adapted to synchronize the maximum discharge stroke of said pressure plunger means with the end of the respective suction stroke of said plunger, said oil reservoir being located above both said displacement chamber and said pressure plunger means.

9. A motor-driven, controlled volume pump as claimed in claim 8, wherein said oil passage means comprises a ball valve assembly, said piston having an aperture therethrough, said ball valve assembly being disposed in said aperture.

10. A motor-driven, controlled volume pump as claimed in claim 8, wherein said oil passage means comprises said piston being formed with a narrow passage therethrough, said passage resisting the flow of oil due to the viscosity of said oil.

References Cited

UNITED STATES PATENTS

| | | | |
|---|---|---|---|
| 1,149,728 | 8/1915 | Ciarlo | 103—38 |
| 2,048,524 | 7/1936 | Svenson | 103—38 |
| 2,709,408 | 5/1955 | Orshansky | 103—38 |
| 2,845,867 | 8/1958 | Shoosmith | 103—6 |
| 2,975,599 | 3/1961 | Bennett | 60—54.6 |
| 3,073,418 | 1/1963 | Bentley | 103—38 |
| 3,077,872 | 2/1963 | Allen | 103—38 |
| 3,149,469 | 9/1964 | Williams | 103—44 |

FOREIGN PATENTS

| | | |
|---|---|---|
| 181,498 | 11/1962 | Sweden. |
| 263,676 | 1/1927 | England. |
| 450,485 | 7/1936 | England. |

ROBERT M. WALKER, *Primary Examiner.*